US009692501B1

(12) United States Patent
Mitchell et al.

(10) Patent No.: US 9,692,501 B1
(45) Date of Patent: Jun. 27, 2017

(54) PROGRAMMABLE DATA NETWORK FOR MOBILE PARKING AREA SYSTEM AND RELATED METHOD

(71) Applicant: Rockwell Collins, Inc., Cedar Rapids, IA (US)

(72) Inventors: James P. Mitchell, Cedar Rapids, IA (US); Arlen E. Breiholz, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 412 days.

(21) Appl. No.: 14/449,606

(22) Filed: Aug. 1, 2014

(51) Int. Cl.
*H04B 7/185* (2006.01)
*H01Q 3/02* (2006.01)
*H01Q 3/24* (2006.01)
*H04B 7/00* (2006.01)
*H01Q 3/00* (2006.01)

(52) U.S. Cl.
CPC ............ *H04B 7/1851* (2013.01); *H01Q 3/02* (2013.01); *H01Q 3/24* (2013.01)

(58) Field of Classification Search
CPC . H04B 7/14; H04B 7/15; H04B 7/185; H04B 7/1851; H04B 1/74; H01Q 3/02; H01Q 3/24; H04W 4/02; H04W 4/04
See application file for complete search history.

(56) References Cited

U.S. PATENT DOCUMENTS 5,960,074 A * 9/1999 Clark ................. H04B 1/74
370/310
9,088,613 B2 * 7/2015 Wahler ................. H04W 4/04

* cited by examiner

*Primary Examiner* — Bernarr Gregory
(74) *Attorney, Agent, or Firm* — Angel N. Gerdzhikov; Donna P. Suchy; Daniel M. Barbieri

(57) ABSTRACT

The present invention is directed to a system and related method providing high speed wireless data connectivity between a vehicle and a temporary stationary location for the vehicle. The system comprises at least three steerable antennas configured for transmission and reception of a broadband RF signal. A first antenna is mounted to the temporary stationary location to send and receive data from one data source available to the system. A second steerable antenna mounted near the temporary location and third steerable antenna mounted to the vehicle provides a communication link between the temporary location and the vehicle. The systems disclosed herein may enable a RF node capable of accepting fiber, cable and satellite modem inputs and communicating wireless gigabit data to a transceiver on the vehicle.

19 Claims, 14 Drawing Sheets

PROGRAMMABLE DATA NETWORK FOR MOBILE PARKING AREA SYSTEM AND RELATED METHOD

CROSS REFERENCE TO RELATED APPLICATIONS

The present application is related to co-pending application Ser. No. 14/300,810 entitled "Hybrid Mobile Internet System" by James P. Mitchell filed on Jun. 10, 2014, the co-pending application is incorporated by reference in its entirety and is assigned to the assignee of the present invention.

FIELD OF THE INVENTION

The present invention relates generally to communication between a vehicle and a stationary location. More particularly, embodiments of the present invention relate to a system and related method for directed communication limited to a point to point between a vehicle and a temporary stationary location for the vehicle.

BACKGROUND

Data transmission available to users onboard a moving vehicle remains a challenge. As data requirements increase, available data sources to a moving vehicle remain static. Bandwidth limits of satellite based systems may limit a user's potential data availability.

Satellite transmissions to areas such as aircraft terminals or other locations where vehicles remain stationary for certain periods of time may require periodic reconfiguration to maintain connectivity. A first satellite vehicle may be initially selected (azimuth, elevation etc.) to provide a specific first content to a vehicle which is stationary at the aircraft terminal or other location. Over time, the selected satellite vehicle may move from its orbital slot and thus, a reconfiguring will be required to retain the availability of the first content at the aircraft terminal or other location. Furthermore, a specific second content from a second satellite vehicle may be desired contemporaneously with the first content. Traditional systems require multiple antennas to be mechanically repositioned to focus on a specific satellite vehicle to simultaneously receive each of the first and second content.

Current wireless services to aircraft vehicles may include Very High Frequency (VHF), High Frequency (HF), Iridium satellite vehicle content, and Inmarsat satellite vehicle content. In addition, a mix of fixed (ground) wireless Radio Frequency (RF) solutions such as domestic and international cellular, WIFI, WIMAX, as well as a statutory 4.9 GHz safety band may be available for data communication between a mobile vehicle and an aircraft terminal.

Once data is available at an aircraft terminal, data transmission from the source at the aircraft terminal to the vehicle remains a challenge. Current wireless media may possess a bandwidth limited not only by propagation limitations, but also by frequency limitations.

Many frequencies may be physically blocked by a wall or vehicle structure. Power output of these transmission or access points may be statutorily limited or physically limited.

Therefore, a need remains for a system and related method offering data communication between a content provider and a vehicle during periods when the vehicle is stationary and available for a high bandwidth communication session.

SUMMARY

Accordingly, a communications system for data networking for a vehicle may comprise a first steerable antenna associated with a station and configured for continuous multi-band bi-directional communication with a plurality of satellite vehicles, a terminal distribution network in communication with at least one of: the first steerable antenna, a wired network, and a wireless network, a second steerable antenna in communication with the terminal distribution network, the second steerable antenna associated with a temporary stationary location for the vehicle, the second steerable antenna configured for directed communication with an antenna associated with the vehicle, an antenna steering system associated with the second steerable antenna and configured for continuous update of an antenna steering solution to enable the directed communication with the antenna associated with the vehicle.

An additional embodiment of the inventive concepts disclosed herein may include a system wherein each of the first steerable antenna and the second steerable antenna further comprises at least one of: a passive electronically scanned array antenna, an active electronically scanned array antenna, a meta material antenna, an electromechanical steered antenna, and a mechanically steered antenna.

An additional embodiment of the inventive concepts disclosed herein may include a system wherein the data network further includes one of: a wired network and a wireless network having one of a substantially omni-directional antenna, a sectored antenna, and a steerable directional antenna and wherein the plurality of satellite vehicles includes a satellite vehicle in at least: a geosynchronous orbit, a low earth orbit, and a medium earth orbit, and wherein the continuous communication is in at least one frequency band associated with the plurality of satellite vehicles.

An additional embodiment of the inventive concepts disclosed herein may include a system wherein the vehicle is at least one of: an aircraft, a train, a boat, a motor vehicle, and a gondola, and wherein the station is at least one of: a commercial airline terminal, an aircraft carrier, a pier, a train station, a stationary building, a mobile device configured for handheld transport, and a mobile support platform configured to support the vehicle.

An additional embodiment of the inventive concepts disclosed herein may include a system wherein directed radio frequency communication or directed optical communication is in at least one of: a terahertz frequency band, a Q band, a U band, a V band, an E band, a W band, a D band, a quasi-optical band, and an optical band, and limited to a line of sight between the second steerable antenna and the antenna associated with the vehicle.

An additional embodiment of the inventive concepts disclosed herein may include a system wherein the antenna steering system operates via one of: an optically generated steering solution and an electrically iterative steering solution, the optically generated steering solution comprising the steps of: detecting a field of view having a potential opposing antenna, the detecting via one of: an optical sensor and a radio frequency sensor, locating the potential opposing antenna in the field of view, measuring a pointing error between the directing and the location of the potential opposing antenna in the field of view, and closing the pointing error by steering the second steerable antenna to the potential opposing antenna.

An additional embodiment of the inventive concepts disclosed herein may include a communications system for data networking for a vehicle, comprising: a first steerable antenna associated with the vehicle and configured for line of sight directed radio frequency communication with at least one second antenna, the first steerable antenna is situated for the line of sight directed radio frequency communication with the at least one second antenna, the line of sight directed radio frequency communication being one of: through an aperture in the vehicle structure and directed toward the at least one second antenna, an antenna steering system associated with the first steerable antenna and configured for one of: an initial fixed alignment and a continuous update, of an antenna steering solution to enable the line of sight directed radio frequency communication with the at least one second antenna.

The communications system for data networking for a vehicle of claim 7, wherein the first steerable antenna further comprises at least one of: a passive electronically scanned array antenna, an active electronically scanned array antenna, a meta material antenna, an electromechanical steered antenna, and a mechanically steered antenna.

An additional embodiment of the inventive concepts disclosed herein may include a system further comprising a data processor coupled with the first steerable antenna for reception and processing of the line of sight directed radio frequency communication via at least one of: a data compression algorithm, a data decompression algorithm, and a data acceleration algorithm.

An additional embodiment of the inventive concepts disclosed herein may include a system wherein the first antenna is disposed within a vehicle structure and the aperture is one of: a physical opening in the vehicle structure and a radio frequency transparent physical barrier associated with the vehicle structure.

An additional embodiment of the inventive concepts disclosed herein may include a system wherein the first steerable antenna is one of: disposed external to the vehicle structure, incorporated with an additional external antenna system, and incorporated as a portion of a consolidated multi-band transceiver system.

An additional embodiment of the inventive concepts disclosed herein may include a method for data networking for a vehicle, comprising: directing a first steerable antenna to continuously communicate with a plurality of satellite vehicles, the first steerable antenna associated with a station, the steerable antenna and configured for multi-band bi-directional communication with the plurality of satellite vehicles, providing data to a terminal distribution network in communication with at least one of: the first steerable station antenna, a wired network, and a wireless network, directing a second steerable antenna to enable directed radio frequency communication with a third antenna, the second steerable antenna in communication with the terminal distribution network and configured for directed radio frequency communication, wherein the directing the second steerable antenna is continuously updated by an antenna steering system, the antenna steering system configured for continuous update of an antenna steering solution to enable the directed radio frequency communication.

An additional embodiment of the inventive concepts disclosed herein may include a method wherein each of the first steerable antenna and the second steerable antenna further comprise at least one of: a passive electronically scanned array antenna, an active electronically scanned array antenna, a meta material antenna, an electromechanical steered antenna, and a mechanically steered antenna.

An additional embodiment of the inventive concepts disclosed herein may include a method wherein the data network further includes one of: a wired network and a wireless network having one of a substantially omni-directional antenna, a sectored antenna, and a steerable directional antenna and wherein the first steerable antenna is configured for tracking the plurality of satellite vehicles including a satellite vehicle in at least: a geosynchronous orbit, a low earth orbit, and a medium earth orbit, and wherein the continuous communication is in at least one frequency band associated with the plurality of satellite vehicles.

An additional embodiment of the inventive concepts disclosed herein may include a method further comprising: directing the third antenna toward the second antenna via the antenna steering system, the third antenna a steerable antenna disposed within a vehicle structure and situated for the line of sight directed radio frequency communication with the second antenna, the line of sight directed radio frequency communication being through an aperture in the vehicle structure, the directing the third antenna is continuously updated by the antenna steering system configured for continuous update of the antenna steering solution to enable the line of sight directed radio frequency communication.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Figure 1:
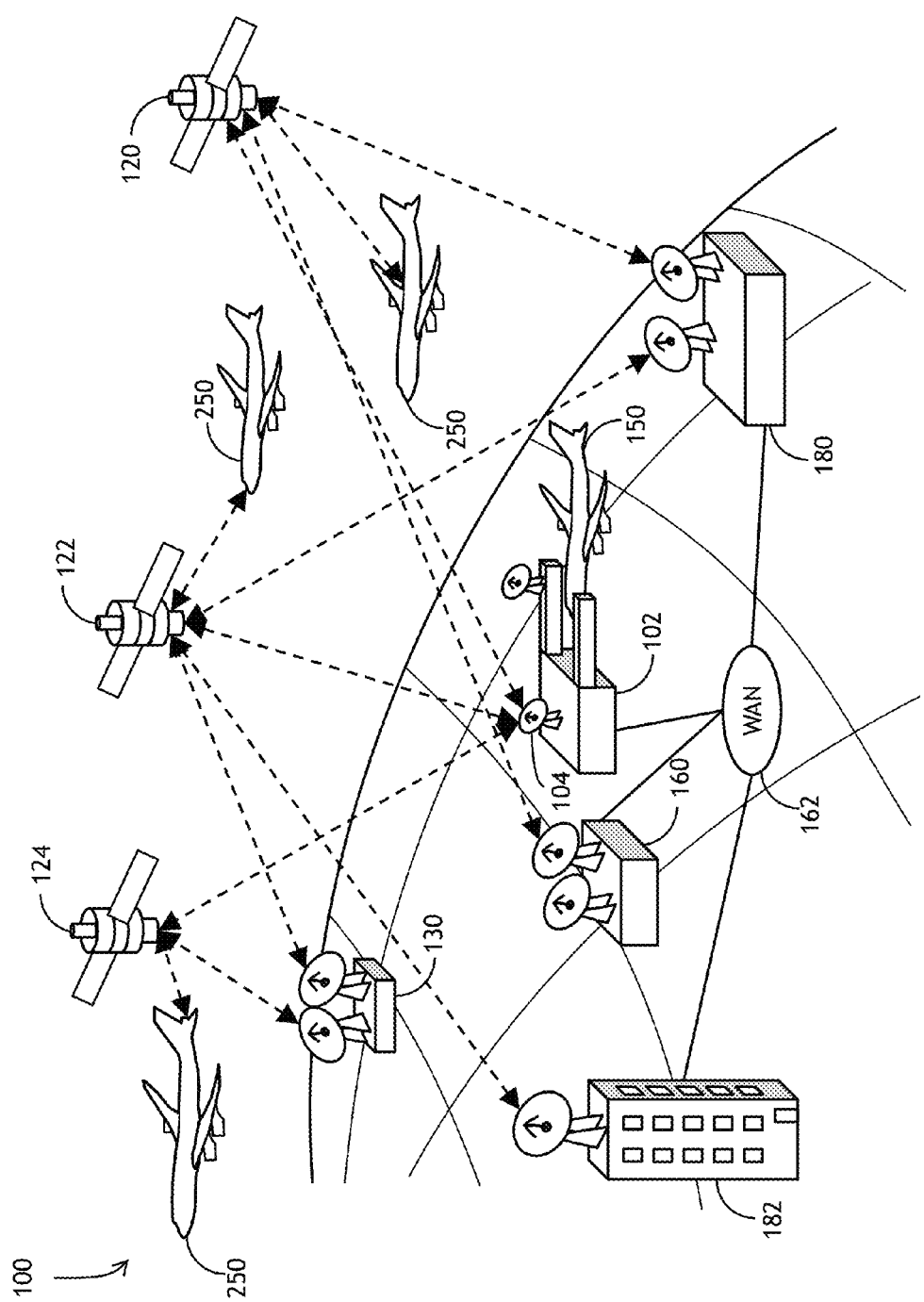
FIG. 1 is a diagram of an overview of a system for programmable data network in accordance with an embodiment of the present invention.

Reference will now be made in detail to the presently preferred embodiments of the invention, examples of which are illustrated in the accompanying drawings.

The present invention is directed to a system and related method for providing high speed wireless data connectivity between a vehicle and a temporary stationary location for the vehicle. The system comprises at least three steerable antennas configured for transmission and reception of a broadband RF signal. A first antenna is mounted to the temporary stationary location to send and receive data from one data source available to the system. A second steerable antenna and third steerable antenna provide a communications link between the temporary location and the vehicle. The second and third antennas may be optically, electrically, and electromechanically steerable to enable directed communication between each other. The systems disclosed herein may enable a RF node capable of accepting fiber, cable, and satellite modem inputs and communicating wireless Gbit (fiber channel) data to a transceiver on the vehicle.

Preferably, between the second and third steerable antennas, systems herein may employ a short-range terahertz data link to provide high bandwidth. Some embodiments may employ a small, low-power transmitter/receiver. Preferably, the power level is such that systems herein may use an array of emitters to get sufficient power for communication over useful distances. Because of the terahertz wavelength, the beam will be so narrow that each transmission of the second and third antennas may behave optically rather than like an omnidirectional radio. In this manner, systems herein may also accurately steer the narrow beam toward the opposite antenna (e.g., from the second antenna toward the third antenna, and vice versa) and continuously update the steering solution to effect continuous communication.

The following description presents certain specific embodiments of the present invention. However, the present invention may be embodied in a multitude of different ways as defined and covered by the claims. In this description, reference is made to the drawings wherein like parts are designated with like numerals throughout.

Ref. No. Description
102 Terminal
104 Terminal Antenna
106 Remote Antenna
108 Terminal Network
110 Jetway
112 Jetway Antenna
120 Geosynchronous Satellite Vehicle
122 Low Earth Orbit Satellite Vehicle
124 Medium Earth Orbit Satellite Vehicle
126 Surface RF antenna
128 Air Traffic Service Provider
130 Relay
150 Surface Vehicle
160 Data Warehouse
162 Wide Area Network
180 Network Operations Center
182 Global Operations Center
250 Airborne Vehicle
304 Data Source
312 Vehicle Antenna
350 Vehicle Door Opening
352 Vehicle Door
402 Flight Deck Data
404 Cabin Data
410 Router
412 Electronic Flight Bag
414 Content Display
420 Onboard Storage
610 Handheld Device
612 Handle
710 Mobile System
712 Vehicle External Antenna
750 Support Platform
1002 Image Processor
1004 Camera
1012 Antenna Control

FIG. 1 Overview

Referring to FIG. 1, a diagram of an overview of a system for programmable data network in accordance with an embodiment of the present invention is shown. A plurality of satellite vehicles may provide data content for multiple sources. A Geosynchronous Satellite Vehicle (GEO SAT) 120 may provide a specific content on a first frequency band available to a surface user while a Low Earth Orbit Satellite Vehicle (LEO SAT) 122 may provide a second content and transmit its signal within a second frequency band. A Medium Earth Orbit Satellite Vehicle (MEO SAT) 124 may provide a third data source via a third frequency band. On occasion, relay 130 may allow content broadcast from a first satellite vehicle to be relayed to a second satellite vehicle.

Desirable content may be provided to the plurality of satellite vehicles from a plurality of surface sources such as a network operations center 180, a data warehouse 160, and a global operations center 182. Such surface sources 160 180 182 may maintain mutual data connectivity via a wide area network 162.

Surface vehicles 150 as well as airborne vehicles 250 may desire access to content on a plurality of frequencies. Embodiments of the present invention may provide content on a plurality of frequencies to a vehicle 150 during a period of time when the vehicle 150 is relatively stationary and on the surface. For example, when the vehicle 150 is an aircraft parked at an airline terminal 102, embodiments herein may supply wideband data connectivity to the vehicle 150.

Figure 2:
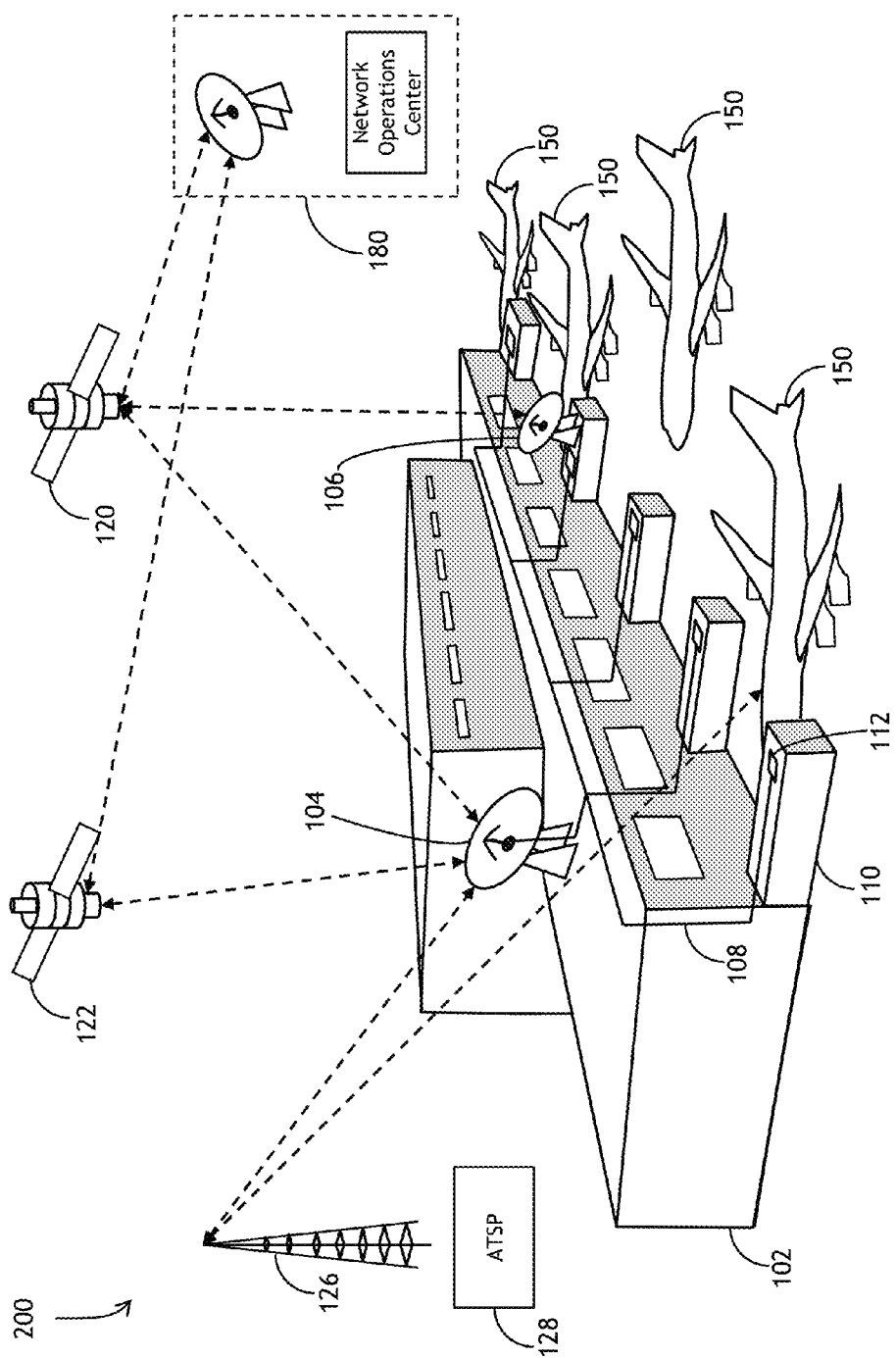
FIG. 2 is a diagram of an overview of a terminal area where an exemplary system of the inventive concepts disclosed herein may be implemented.

FIG. 2 Terminal Overview

Referring to FIG. 2, a diagram of an overview of a terminal area where an exemplary system of the inventive concepts disclosed herein may be implemented is shown. Mounted to the terminal 102 is a steerable terminal antenna 104 configured to receive each type of data content and configured to receive and process a plurality of frequencies and track and communicate with a plurality of satellite vehicles.

In addition, remote antenna 106 may perform similar function to that of the steerable terminal antenna 104. Remote antenna 106 may supply a communications link for one or more vehicles 150. Conceptually similar, remote antenna 106 and steerable terminal antenna 104 may perform distinct functions to supply each vehicle 150 with desired content.

In one embodiment, remote antenna 106 and receiver for communication with the satellites 120 and 122 may be physically co-located with the jetway antenna 112. In this manner, a complete system may operate at the jetway to deliver data to the vehicle 150.

Terminal data network 108 may function as a supply route for communications between each node in the network. For example, steerable terminal antenna 104 and remote antenna 106 may supply terminal data network 108 with desired data content.

A wireless link may function as the terminal data network 108. In one embodiment, terminal data network may be incorporated as a radio frequency network operating from a first network antenna associated with the steerable terminal antenna 104 and a second network antenna associated with the steerable jetway antenna 112.

Wireless terminal data network 108 may employ a substantially omni-directional, sectored and/or steerable directional antenna. Wireless terminal network 108 may further use unlicensed 802.11 or UNII bands such as a 2.4 GHz band, 5.25-5.75 GHz band, and/or 60, 70 and 80 GHz bands. Steerable jetway antenna 112 may perform as the access point for each vehicle 150 to connect to the terminal data network 108. In one embodiment, due to limited range of the directed communication between jetway antenna 112 and each vehicle 150, each jetway 110 may house a steerable jetway antenna 112.

FIG. 3 System 300

Figure 3:
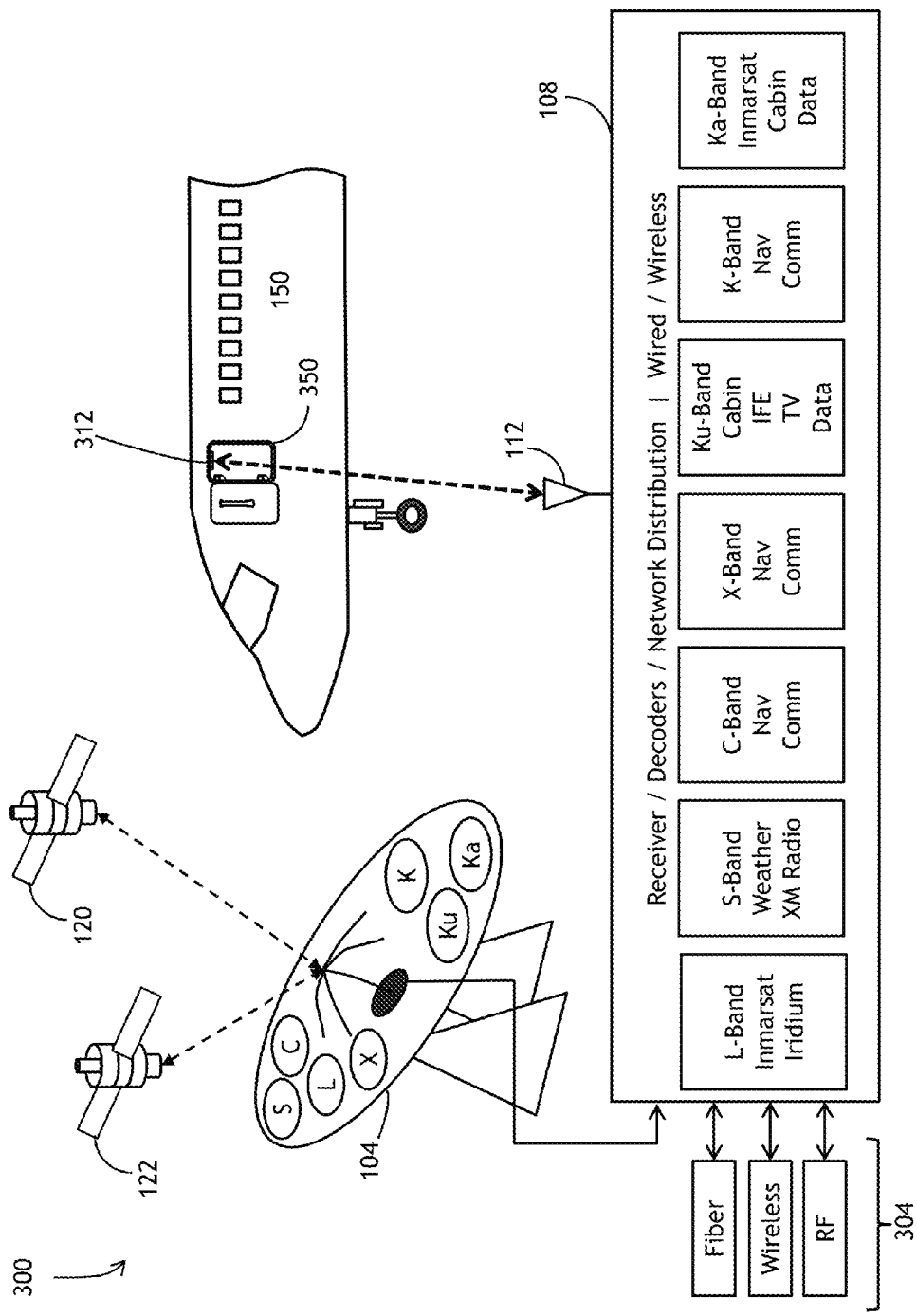
FIG. 3 is a diagram of a system for programmable data network exemplary of an embodiment of the present invention.

Referring to FIG. 3, a diagram of a system for programmable data network exemplary of an embodiment of the present invention is shown. System 300 preferably comprises three steerable antennas and an associated data network: 1) steerable terminal antenna 104; 2) steerable jetway antenna 112; and 3) steerable vehicle antenna 312; and 4) terminal data network 108. Since steerable terminal antenna 104 is actively steerable, system 300 may command steerable terminal antenna 104 to track a relatively fixed GEO SAT 120 and a high track crossing rate LEO SAT 122 either individually or simultaneously. It is contemplated that steerable terminal antenna 104 may be equipped with a time division communications capability to simultaneously track more than one satellite and communicate with each of the tracked satellite vehicles on a time division basis.

Alternatively, systems herein may command steerable terminal antenna 104 to remotely change a signal/content provider to exclusively communicate with a specific satellite vehicle to enable a higher data transfer rate. In this manner, systems herein may focus the communications beam of steerable terminal antenna 104 on a specific LEO SAT 122, for example, to enable efficient delivery of the content available as relayed by the LEO SAT 122. This "broadband to the gate" may support a transfer of data to the vehicle 150 enabling highly efficient data transfer speeds.

Further, steerable terminal antenna 104 may be configured to receive and process signals from an air traffic service provider 128 via surface RF antenna 126. In this manner, steerable terminal antenna 104 may effectively communicate with a plurality of surface based, airborne, and space based communication nodes to send and receive data via a plurality of spectrum unlimited frequencies and beams focused to effectively communicate via a plurality of desired signals.

Terminal data network 108 may receive data from additional data source 304. Preferably data source 304 may include a fiber source, a wireless source, and an RF source to bring additional content to each vehicle 150 via terminal data network 108.

System 300 may command steerable terminal antenna 104 to receive one or more signals on one or more frequencies. Preferably, system 300 may enable terminal network 108 to receive and decode signals via a nonexclusive frequency list including L band, S-band, C, band, Ku, band, K band, and Ka band to communicate with a content provider. It is contemplated that system 300 may communicate on additional frequencies not listed here to make desired content available to the vehicles 150.

Steerable jetway antenna 112 may perform directed communication with steerable vehicle antenna 312 to make content available to vehicle 150. In one embodiment, Steerable vehicle antenna 312 may be positioned just inside a vehicle door opening 350. Such placement of steerable vehicle antenna 312 may enable line of sight directed communications between the steerable vehicle antenna 312 and the steerable jetway antenna 112, as well as limiting propagation of the directed beam.

Figure 4:
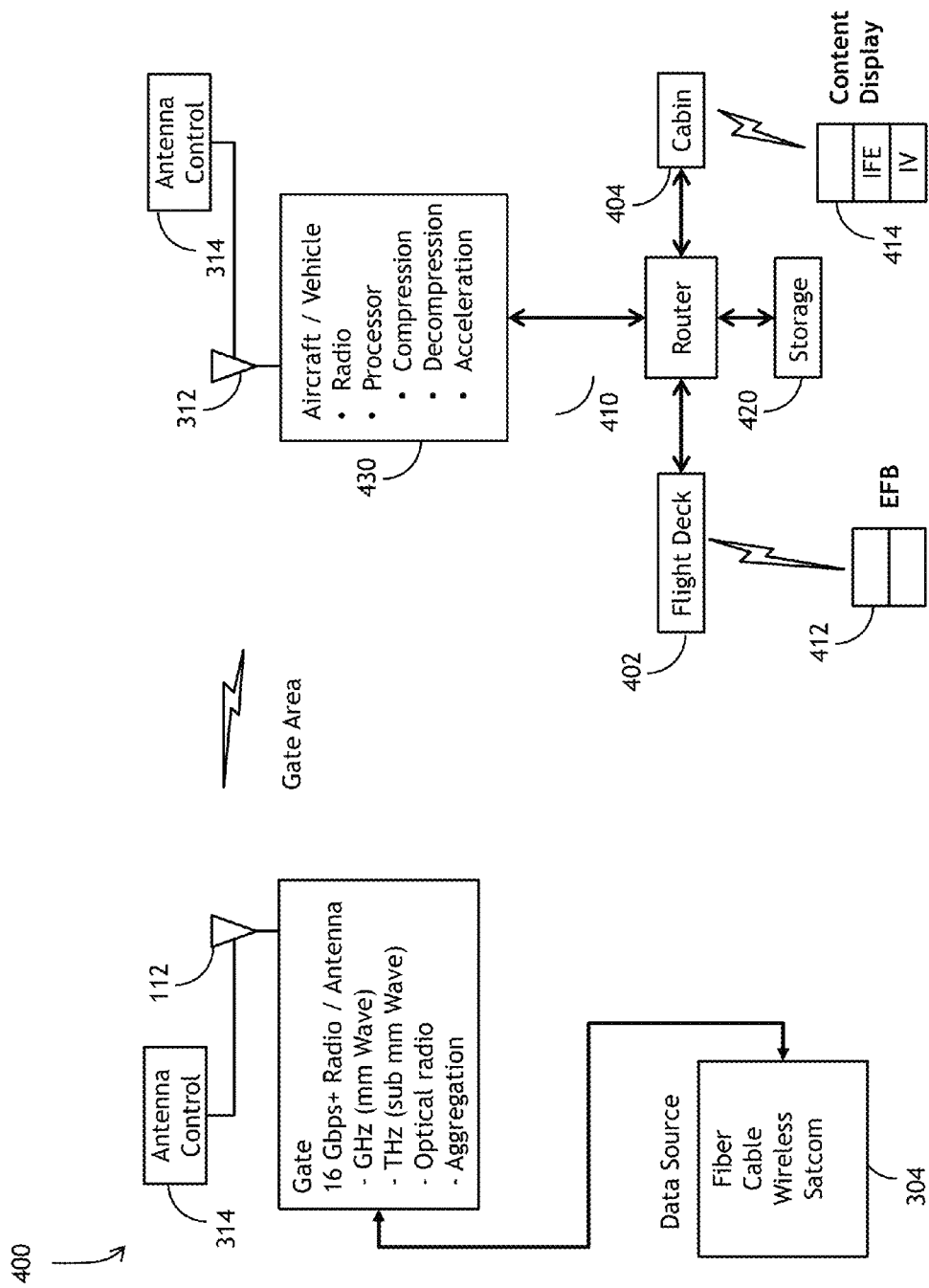
FIG. 4 is an diagram of exemplary components associated with an embodiment of the present invention.

FIG. 4 System Details

Referring to FIG. 4, a diagram of exemplary components associated with an embodiment of the present invention is shown. System 300 may receive data and content from data sources 304 and deliver the content to a final user onboard the vehicle 150. Steerable jetway antenna 112 and steerable vehicle antenna 312 may be directed toward one another via antenna control 314 associated with each of the steerable jetway antenna 112 and the steerable vehicle antenna 312.

In a preferred embodiment, steerable jetway antenna 112 is optically steerable communicating with optically steerable vehicle antenna 312. Antenna control 314 may operate to steer each antenna beam toward the other, enabling continuous updating of a steering solution and thus uninterrupted directed communication between the antennas. Alternatively, each steerable antenna may be electrically steered, electromechanically steered, and mechanically steered to enable the higher frequencies to communicate between the antennas.

In some embodiments, system 300 may transmit a directed communications signal between steerable jetway antenna 112 and steerable vehicle antenna 312 in the gigahertz (GHz) frequency spectrum, the terahertz (THz) frequency spectrum, and the optical radio spectrum.

In some embodiments, system 300 may employ a RF connection of directed communication between the steerable jetway antenna 112 and steerable vehicle antenna 312 in the THz frequency band. Such frequency band may operate in the range of 300 GHz to 3 THz and be limited to a range of several meters.

One advantage of minimal propagation may include a similar frequency band usable by system 300 repeated at each steerable jetway antenna 112 without interfering with a nearby directed communication session.

System 300 THz capabilities between each steerable antenna element may provide a bandwidth capable of transmission of a large amount of data during the time the vehicle door 350 is open. In one embodiment, system 300 may operate at an exemplary 60 GHz to deliver 7+ Gbps from jetway to vehicle 150.

Onboard the vehicle 150, vehicle radio 430 may operate to receive the signals, process, and transmit to vehicle router 410. Within the signal processing, system 300 may employ a data compression, a decompression, and acceleration algorithm to efficiently transfer data from point to point. U.S. Pat. No. 7,761,793 (hereinafter '793) to Mitchell entitled "SATCOM data compression system and method" and related U.S. Pat. No. 7,023,365 (hereinafter '365) to Mitchell, et. al. entitled "System and method for compression of words and phrases in text based on language features" describe compression techniques available to system 300 and are hereby incorporated by reference in their entirety.

The '793 patent describes a method of data compression for compressing a web page. The method comprises the steps of storing the web page having graphics files, text files, JAVA scripts, and HTML files in a temporary directory. The graphics files are sorted into lossless files and lossy files. The lossless files may be decimated and the lossy files may be de-featured. The de-featured lossy files may be transcoded. The transcoded and de-featured lossy files, the decimated lossless files, the text files, JAVA scripts, and the HTML files are all concatenated and then compressed in a final compression process to yield a compressed web page.

The '793 patent continues with obtaining the HTML files from the temporary directory, scanning the HTML files for graphics file references, and enabling concatenating when the graphic files cease accumulating in the temporary directory as indicated by the graphic file references. Concatenation is enabled when the graphic files cease accumulating in the temporary directory after a preset time or when some percentage of the files is delivered from the Internet.

The '365 patent describes a system for compressing text using variable length codes includes a memory device configured to store a set of variable length codes for a plurality of languages for compression of text, wherein the set of variable length codes includes variable code lengths based on language features and an encoder coupled to the memory device, the encoder configured to receive text in at least one of the plurality of languages, to generate a compressed text by assigning a code to each word in the text based on codes from the set of variable length codes that are associated with the at least one language of the text and to generate at least one header to be inserted in the compressed text, the header including information regarding the location in the compressed text of a subsequent change in code length.

Router 410 may receive and route data to various locations throughout the vehicle 150. In one commercial aircraft embodiment, router 410 may route data to an aircraft flight deck 402 and to an aircraft cabin 404. From each location, varieties of applications may benefit from use of the up to date content. ON the flight deck, an electronic Flight Bag (EFB) 412 may receive an updated list of enroute charts for the upcoming flight. Within the cabin, In Flight Entertainment (IFE) 414 may receive a newly released video and a list of current sales available to onboard customers via an Interactive Video (IV) sales provider.

In one example, system 300 may load current content onboard storage 420 for use during flight. With increased onboard storage 420 available to aircraft manufacturers, onboard storage 420 may provide sufficient capability to store desirable content requested during flight. For example, system 300 may load current newspaper content onboard storage 420 to be accessible by a user inflight. It is contemplated herein, during a normal turnaround of the aircraft (e.g., fifteen to thirty minutes) while the aircraft door is open, system 300 data transfer rates may be realized in the petabyte (PB) range.

Embodiments of the present invention may supply a data source for multiple onboard systems. Some onboard systems may include content such as that offered via a wired surface network. U.S. patent application Ser. No. 14/300,810 (hereinafter the '810 application) by Mitchell entitled Hybrid Mobile Internet System describes a method of content availability, and is hereby incorporated herein by reference in its entirety.

The '810 application details a system wherein a passenger may request specific content be loaded onboard aircraft storage 420 to be accessible by the user during the period where data transfer rates may be more expensive and/or non-existent (e.g., when the aircraft is airborne). In this manner, a user may request the content before the flight, access the content during the flight, and interact with the system 300 as if the user were interacting with the actual ground based server originally providing the content.

Initially, as each antenna is attempting to acquire the other, system 300 may command an initial gross alignment to begin the alignment process. Once the initial alignment is complete, system 300 may enable accurate alignment of the directed communication beams.

In one embodiment, system 300 may terminate power to each antenna as one of the doors is closed. For example, on the jetway 110, a switch associated with a jetway door or manually initiated by a jetway operator may terminate power to the steerable jetway antenna 112. Similarly, a switch onboard the vehicle 150 associated with the vehicle door 352 may terminate power to the system 300. It is further contemplated herein; system 300 may command a search mode for the steerable jetway antenna 112 should the steerable jetway antenna 112 maintain an operational status (powered on) with no visible steerable vehicle antenna 312 with which to communicate.

Figure 5:
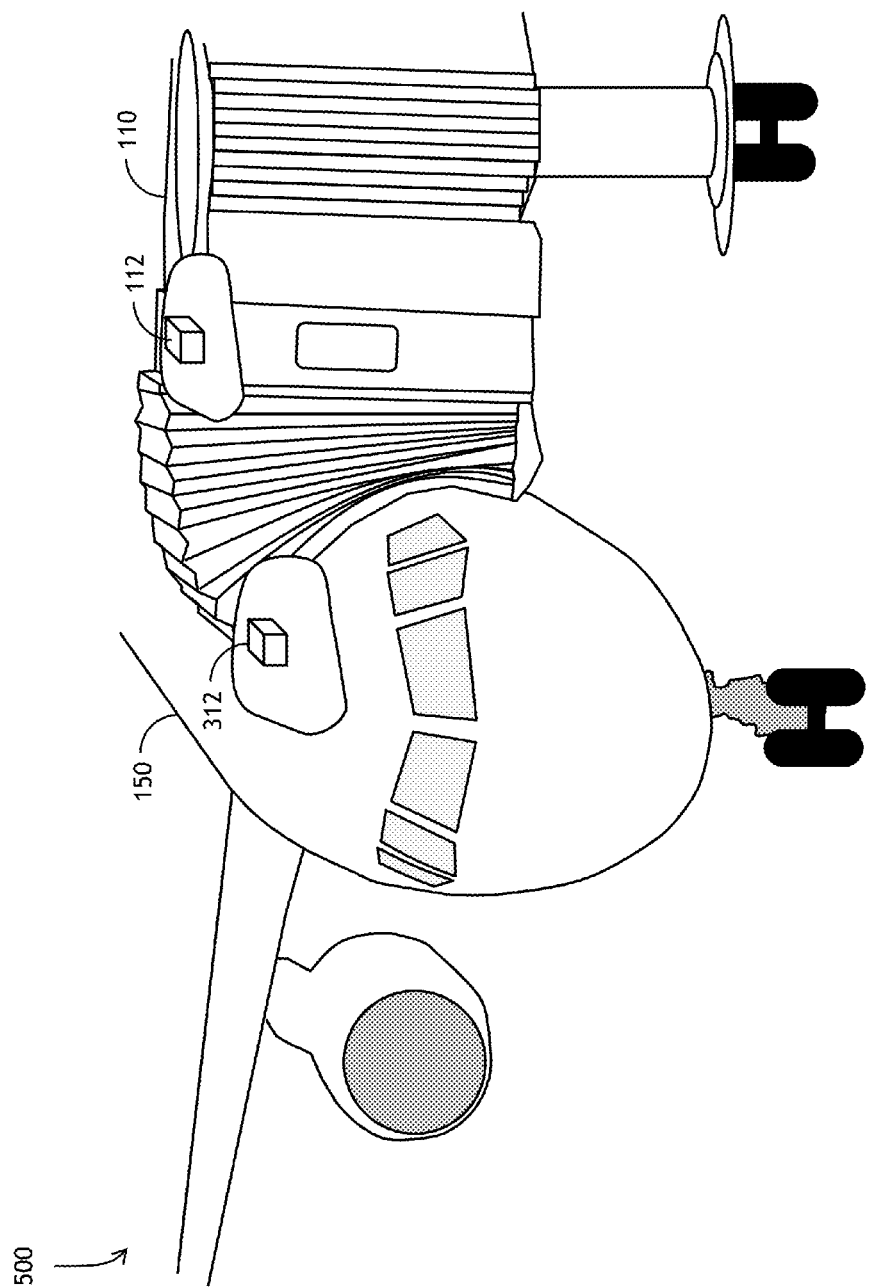
FIG. 5 is a diagram of a jetway antenna and an aircraft antenna implemented with an exemplary embodiment of the present invention.

FIG. 5 Jetway Embodiment

Referring to FIG. 5, a diagram of a jetway antenna and an aircraft antenna implemented with an exemplary embodiment of the present invention is shown. System 300 may command steerable jetway antenna 112 disposed on jetway 110 to communicate with steerable vehicle antenna 312 disposed on vehicle 150.

Figure 6:
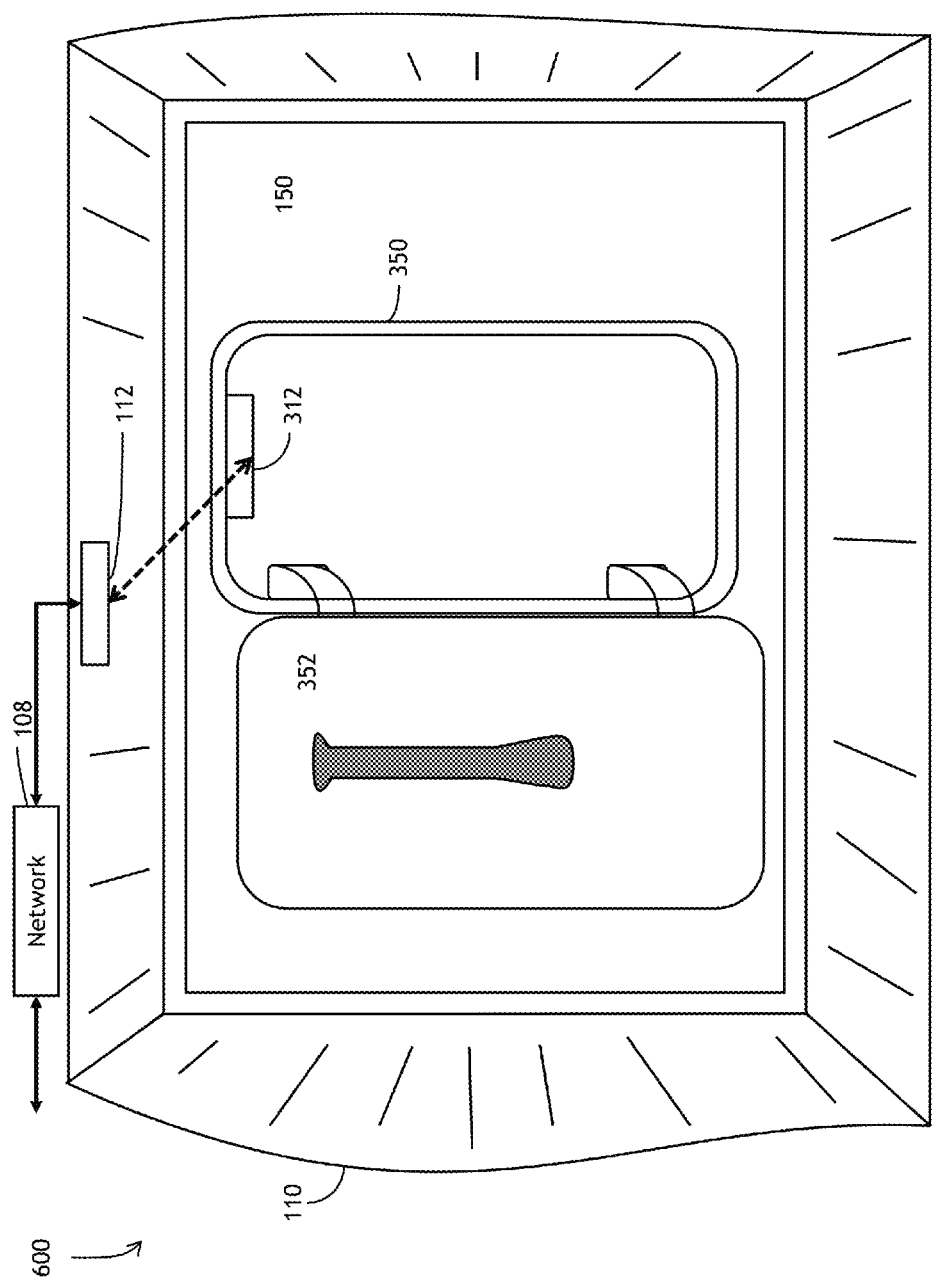
FIG. 6 is a diagram of jetway antenna and an aircraft antenna implemented with an exemplary embodiment of the present invention.

FIG. 6 Jetway Embodiment

Referring to FIG. 6, a diagram of jetway antenna and an aircraft antenna implemented with an exemplary embodiment of the present invention is shown. As the vehicle door 352 is opened, a "tunnel" is created enabling a non-propagated signal to travel between the antennas 112 and 312. This tunnel created by the jetway 110 as well as the vehicle aperture 350 may limit signal propagation external to the desired signal pathway.

Figure 7:
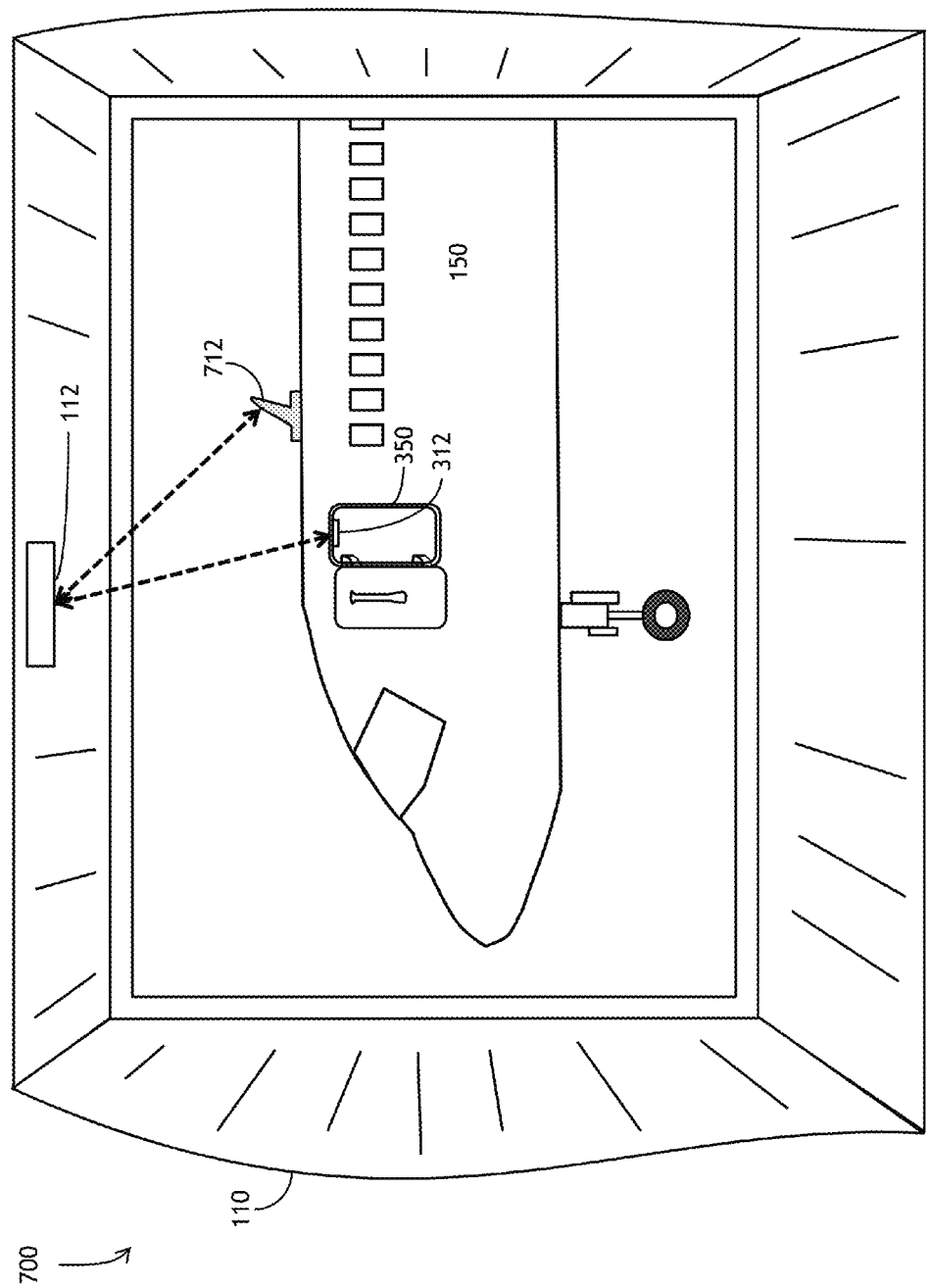
FIG. 7 is a diagram of a directional jetway antenna and associated aircraft antennas exemplary of one embodiment of the present invention.

FIG. 7 Remote Parking Embodiment

Referring to FIG. 7, a diagram of a directional jetway antenna and associated aircraft antennas exemplary of one embodiment of the present invention is shown. In one embodiment, the directed communication between the jetway antenna 112 and the vehicle antenna 312 may operate within the tunnel limiting RF propagation outside the intended transmission path. Preferably, the steerable vehicle antenna 312 is disposed within the structure of the vehicle 150 and limited to line of sight.

In an additional embodiment, steerable vehicle antenna 712 may be disposed external to the vehicle 150 structure. In this manner, system 300 may enable directed communication between jetway and vehicle 150 without concern for an antenna mounted internal to the structure. In this embodiment, accurate steering of the transmission beam may enable secure communication between antennas 112 and 712.

Figure 8:
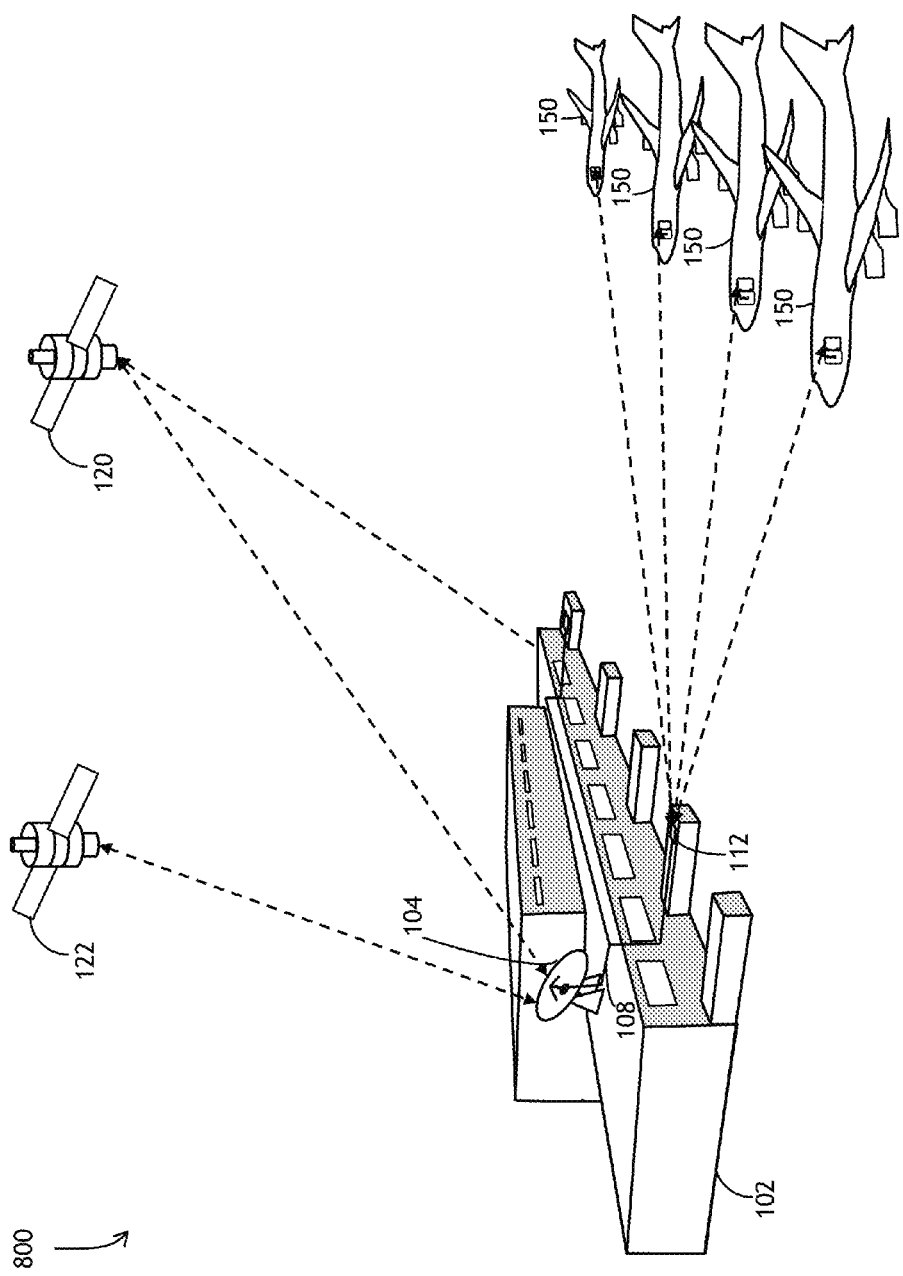
FIG. 8 is a diagram of a jetway antenna capable of servicing a plurality of aircraft exemplary of one embodiment of the present invention.

FIG. 8 One Jetway Antenna Multiple Vehicles

Referring to FIG. 8, a diagram of a jetway antenna capable of servicing a plurality of aircraft exemplary of one embodiment of the present invention is shown. In additional embodiments, system 300 may supply a central steerable jetway antenna 112 to supply a directed communication signal to multiple vehicles 150. In this manner, a single antenna 112 may simultaneously direct a transmission beam to two or more target vehicle antennas 312 allowing each vehicle 150 to receive a transmission.

Here, an optical transmission medium may be one available option. Since range between antennas may be an issue for higher frequency RF elements, system 300 may employ an optical radio to accomplish the directed communication.

Figure 9:
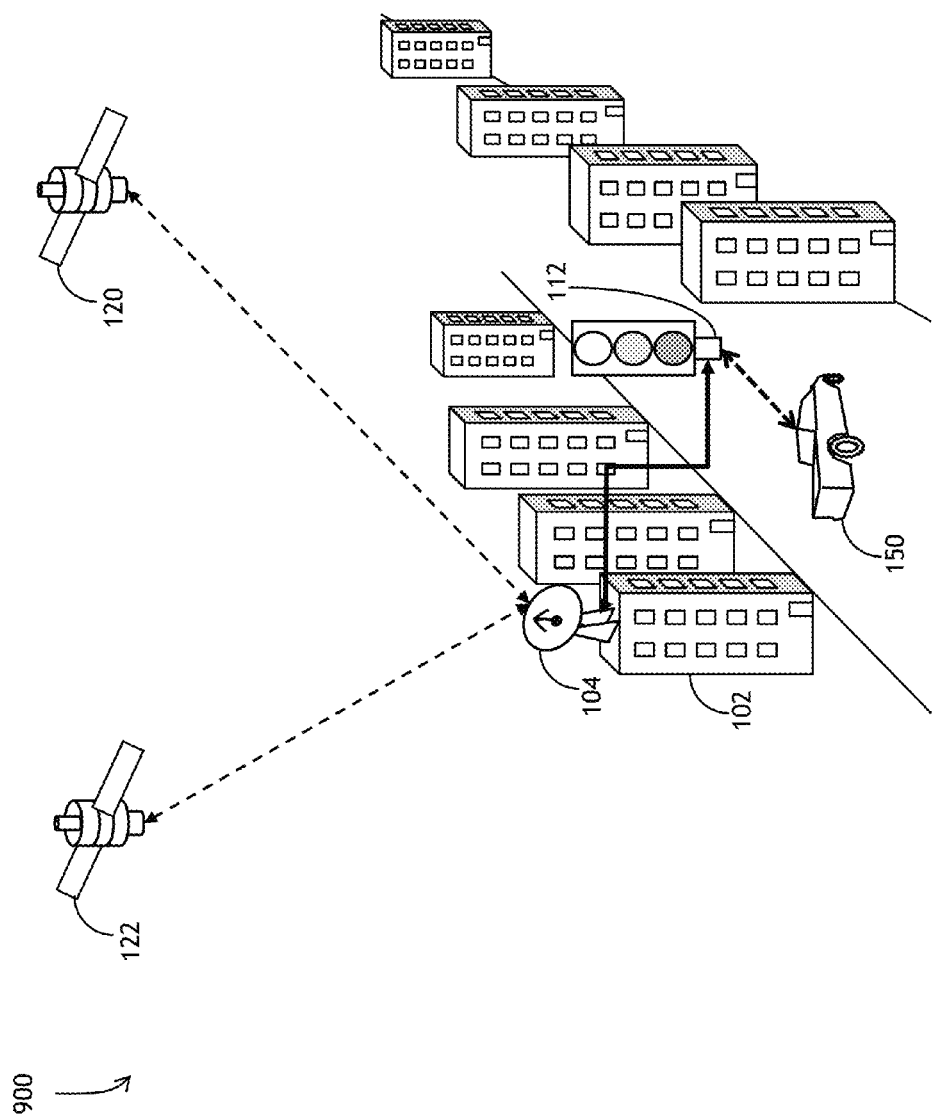
FIG. 9 is a diagram of a system configured for surface vehicle exemplary of one embodiment of the present invention.

FIG. 9 Motor Vehicle

Referring to FIG. 9, a diagram of a system configured for surface vehicle exemplary of one embodiment of the present invention is shown. Additional implementations of system 300 may include a surface vehicle 150 temporarily stopped at a stop light and/or a fuel station. In this implementation, steerable jetway antenna may be incorporated within the structure of the stop light and steerable vehicle antenna may be incorporated with a dash of the vehicle 150. During a momentary stop, system 300 may acquire each antenna, receive a request for data, and transfer data between antenna elements until the range between elements may increase to a point of acquisition loss.

Support station where a vehicle may be stationary for a period. An aircraft carrier embodiment may allow content transfer between the terminal antenna 104 disposed on the superstructure of the ship, the jetway antenna 112 disposed near a catapult, and the vehicle antenna disposed under the fuselage of a fighter aircraft vehicle 150. Similarly a Locomotive Rail engine may support one embodiment of system 300 while a Submarine Tender may support another.

In another embodiment, terminal 102 may be a small form factor mobile support platform configured to support the vehicle. In this embodiment, a mobile support platform may be a handheld device configured for carrying out the method steps of system 300. For example, a handheld device may operate to 1) receive a satellite based signal, 2) communicate with the vehicle antenna 312 via the handheld device jetway radio 112 and 3) transfer data to the vehicle system. In this manner, a small form factor device may operate the function of system 300 to enable a programmable data network for the vehicle.

In another embodiment, terminal 102 may be a mobile support platform primarily configured for support of the vehicle. For example, a catering truck or baggage belt loader may support a terminal antenna 104, the distribution network 108 and the jetway antenna 112 to allow data transfer to the vehicle antenna 312. In addition, a fueling truck and a fueling location may provide the necessary elements of system 300 to enable the directed RF communication to the vehicle.

Additionally, the terminal 102 is one example of a temporary stationary location for the vehicle. Additional embodiments may include a business jet hangar operating as the terminal 102 with associated parking areas for a business aircraft. The jetway antenna 112 may mount near a parking area for a business aircraft and the vehicle antenna 312 may optionally mount within the structure of the business aircraft.

Figure 10:
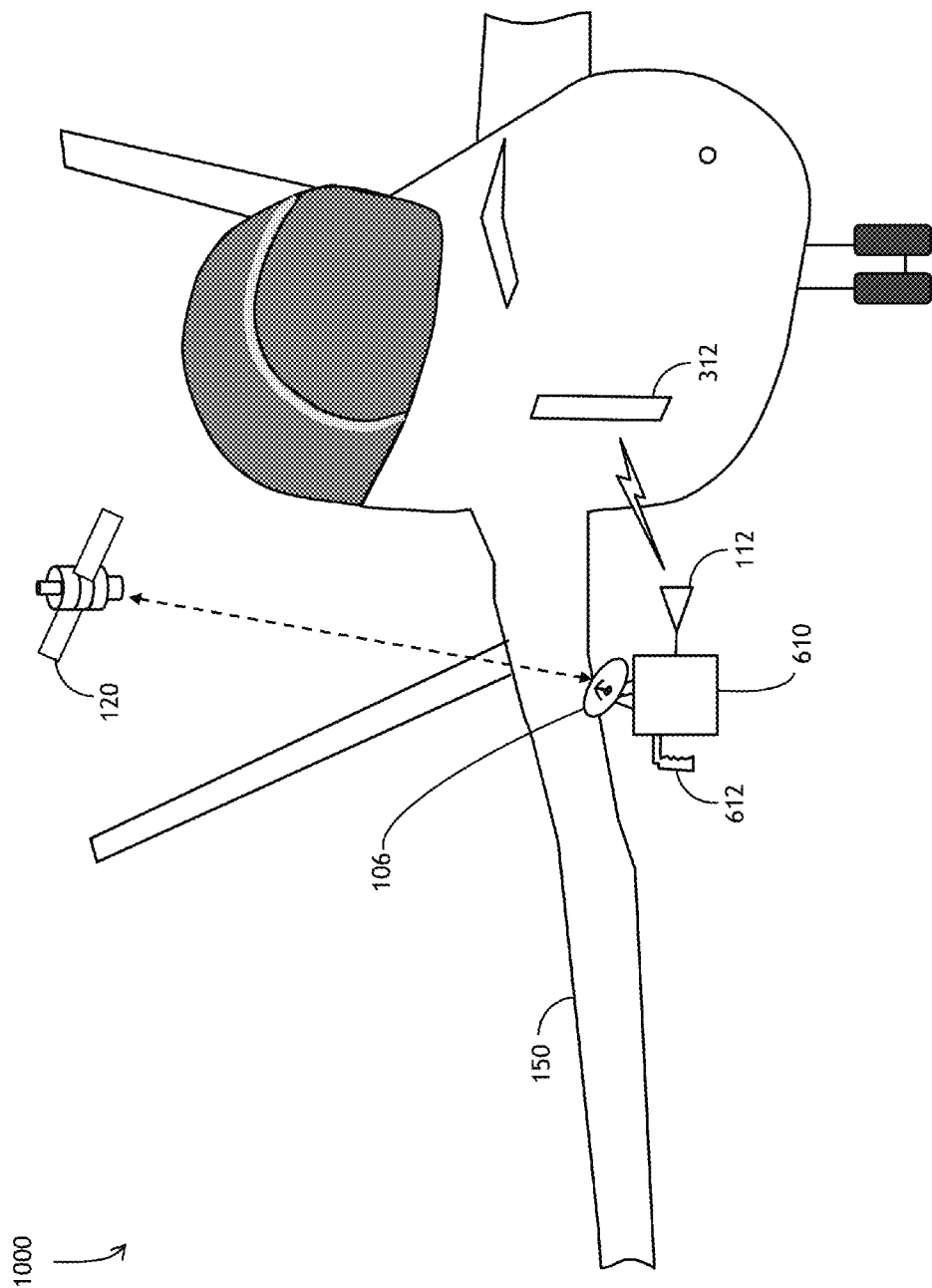
FIG. 10 is a diagram of a mobile system configured for a fighter aircraft vehicle exemplary of one embodiment of the present invention.

FIG. 10 Handheld Device

Referring to FIG. 10, a diagram of a mobile system configured for a fighter aircraft vehicle exemplary of one embodiment of the present invention is shown. Additional implementations of system 300 may include a handheld device 610 configured for delivering data to the vehicle 150. In this embodiment, remote antenna 106 is preferably mounted to handheld device 610 to receive the signals from the plurality of satellite vehicles, process the signals, and deliver the data to the vehicle 150 via jetway antenna 112. Vehicle antenna 312 may receive the signals as above in previous embodiments. A user of handheld device 610 may operate and carry the handheld device 610 from vehicle 150 to vehicle 150 via a handle 612.

Figure 11:
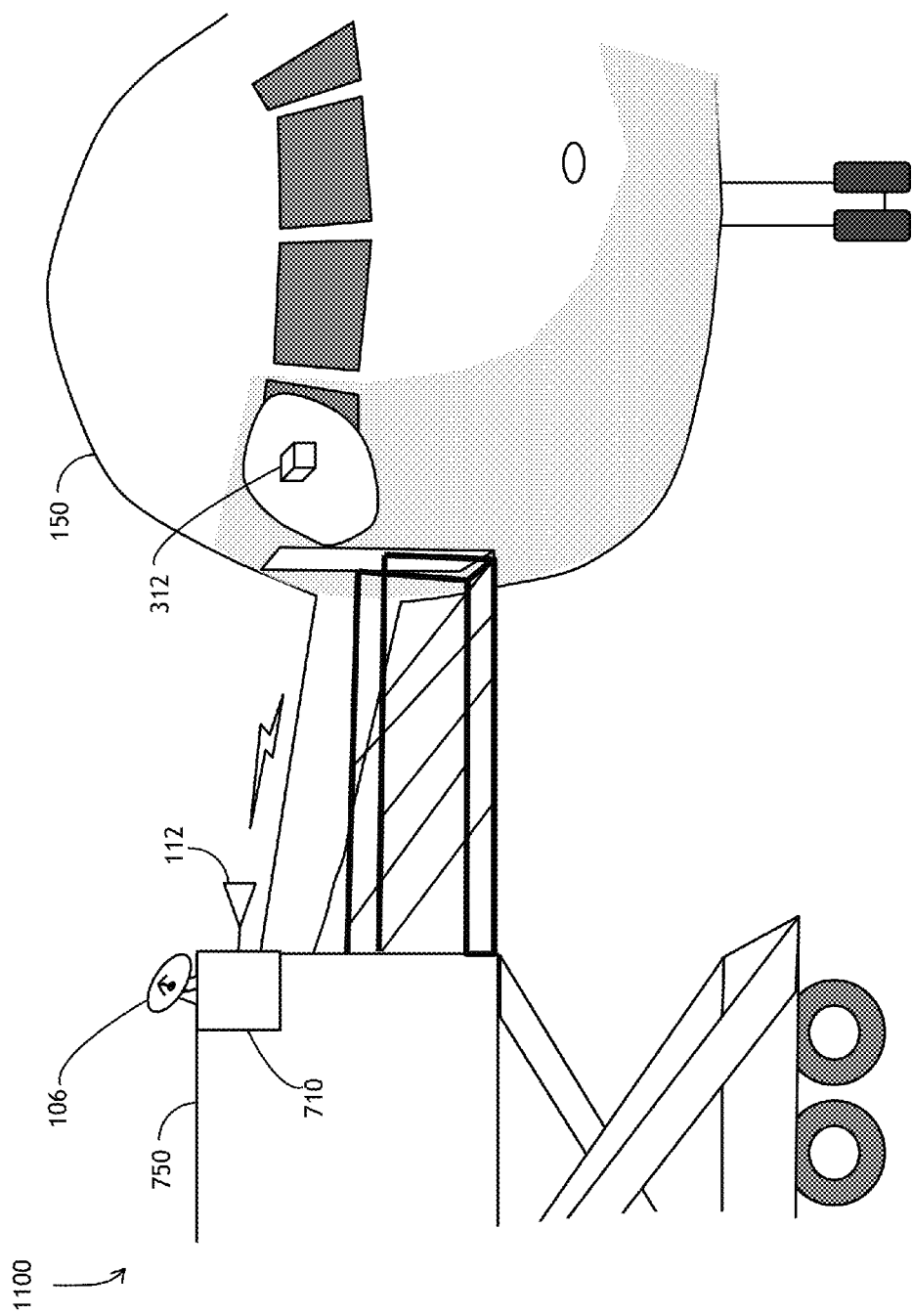
FIG. 11 is a diagram of a system configured for a catering truck application for an aircraft vehicle exemplary of one embodiment of the present invention.

FIG. 11 Catering Truck

Referring to FIG. 11, a diagram of a system configured for a catering truck application for an aircraft vehicle exemplary of one embodiment of the present invention is shown. Additional implementations of system 300 may include a mobile application of system 300 onboard a platform configured for support of the vehicle 150. Here, a catering truck 750 may operate as the support platform configured with a vehicle borne embodiment 710 of system 300. Here, system 300 may receive power from the catering truck power system and operate to deliver data the vehicle 150.

Figure 12:
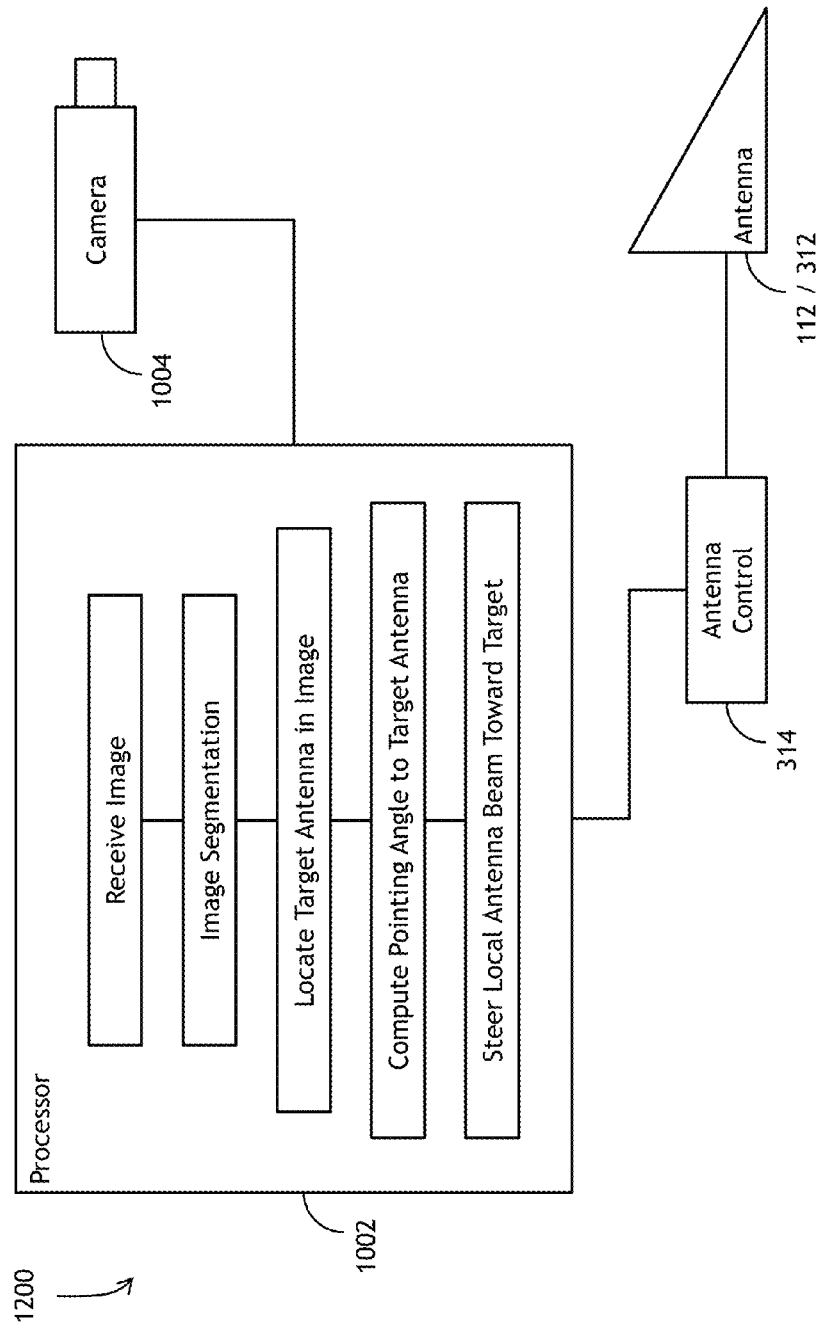
FIG. 12 is a diagram of an exemplary system for antenna pointing angle implemented with one embodiment of the present invention.

FIG. 12 Antenna Optical Steering

Referring to FIG. 12, a diagram of an exemplary system for antenna pointing angle implemented with one embodiment of the present invention is shown. System 300 may direct antenna control 314 using a plurality of methods.

Preferably, system 300 may be optically steered to determine a proper look angle for the steerable jetway antenna 112 as well as the steerable vehicle antenna 312. In additional embodiments, each steerable antenna may be electrically steered using an iterative approach to determine antenna look angle.

In embodiments, system 300 may employ an optical steering system to accomplish this task. Camera 1004 may be directed to search or project an image to receive and process. Process 1002 may accomplish the steps of receiving the image, segmenting the image, locating the target antenna within the image, computing the pointing angle to the target antenna, and steering the local antenna beam toward the target antenna. In this manner, steerable jetway antenna 112 and steerable vehicle antenna 312 may function to mutually steer at on another to enable directed communication.

Preferably, processor 1002 may continuously operate to ensure communication is uninterrupted. For example, during loading cargo onboard an aircraft, the aircraft may settle from an unloaded state to a loaded state. Such settling may cause misalignment of a mutually steerable antenna system if the systems did not actively update the look angle. System 300 actively commands processor 1002 to update the look angle of the local antenna to ensure the local antenna is pointing at the target antenna.

Figure 13:
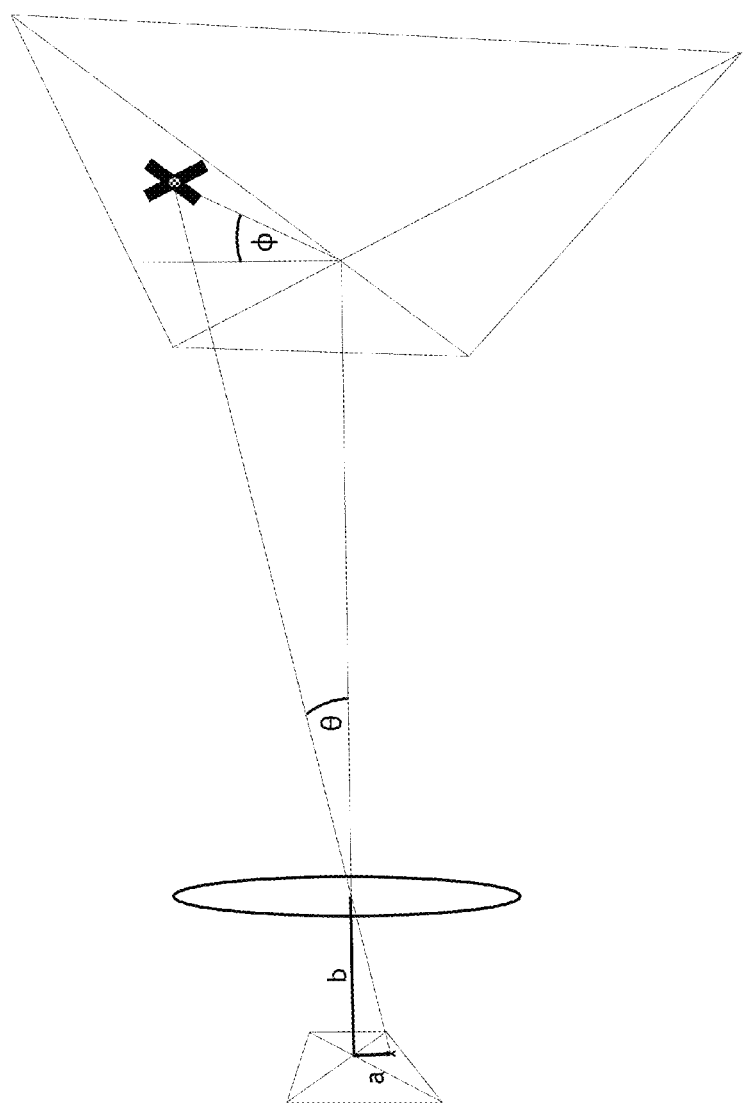
FIG. 13 is a diagram of one angle calculation usable by embodiments of the present invention.

FIG. 13 Optical Geometry

Referring to FIG. 13, a diagram of one angle calculation usable by embodiments of the present invention is shown. The error in pointing of the antenna/lens system, $\theta$, is the arctangent of distance a/b. In-plane angle, $\phi$, is directly reflected in the plane of the image.

The pointing process may be improved by including a method to estimate the distance to various parts of the target antenna. This may allow estimation of the degree to which the two antennas are not parallel. One embodiment may accomplish this task by ultrasonic or optical range finding based on radar principles of measuring the time of flight of a signal from the sensor to portions of the target.

In one embodiment, system 300 may employ a range finding element to determine a range between the steerable vehicle antenna 312 and the steerable jetway antenna 112. A simpler, commonly used approach may include illumination of the target with "structured light," that is a pattern of stripes or dots of known angular spacing. System 300 may then use image processing to estimate the distance of any part of the image based on the apparent spacing of the structure light falling on that area.

FIG. 14 Flowchart

Figure 14:
FIG. 14 is a flow diagram of a method for a programmable data network exemplary of an embodiment of the present invention.

Referring to FIG. 14, a flow diagram of a method for a programmable data network exemplary of an embodiment of the present invention is shown. Method 1200 may begin, at step 1202 with directing a first steerable antenna to continuously communicate with a plurality of satellite vehicles, the first steerable antenna associated with a station, the steerable antenna and configured for multi-band bi-directional communication with the plurality of satellite vehicles, and at step 1204, providing data to a terminal distribution network in communication with at least one of: the first steerable station antenna, a wired network, and a wireless network.

Method 1200 may continue at step 1206 with directing a second steerable antenna to enable directed radio frequency communication with a third antenna, the second steerable antenna in communication with the terminal distribution network and configured for directed radio frequency communication, and at step 1208 wherein the directing the second steerable antenna is continuously updated by an antenna steering system, the antenna steering system configured for continuous update of an antenna steering solution to enable the directed radio frequency communication.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression).

For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats.

However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution.

Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs.

Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.).

Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is shown/described herein as a single illustrated figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A communications system for data networking for a vehicle, comprising:
   a first steerable antenna associated with a station and configured for continuous multi-band bi-directional communication with a plurality of satellite vehicles;
   a terminal distribution network in communication with at least one of: the first steerable antenna, a wired network, and a wireless network;
   a second steerable antenna in communication with the terminal distribution network, the second steerable antenna associated with a temporary stationary location for the vehicle, the second steerable antenna configured for directed communication with an antenna associated with the vehicle; and
   an antenna steering system associated with the second steerable antenna and configured for continuous update of an antenna steering solution to enable the directed communication with the antenna associated with the vehicle.

2. The communications system for data networking for a vehicle of claim 1, wherein each of the first steerable antenna and the second steerable antenna further comprises at least one of: a passive electronically scanned array antenna, an active electronically scanned array antenna, a meta material antenna, an electromechanical steered antenna, and a mechanically steered antenna.

3. The communications system for data networking for a vehicle of claim 1, wherein the data network further includes one of: a wired network and a wireless network having one of a substantially omni-directional antenna, a sectored antenna, and a steerable directional antenna and wherein the plurality of satellite vehicles includes a satellite vehicle in at least: a geosynchronous orbit, a low earth orbit, and a medium earth orbit, and wherein the continuous communication is in at least one frequency band associated with the plurality of satellite vehicles.

4. The communications system for data networking for a vehicle of claim 1, wherein the vehicle is at least one of: an aircraft, a train, a boat, a motor vehicle, and a gondola, and wherein the station is at least one of: a commercial airline terminal, an aircraft carrier, a pier, a train station, a stationary building, a mobile device configured for handheld transport, and a mobile support platform configured to support the vehicle.

5. The communications system for data networking for a vehicle of claim 1, wherein the directed communication is in at least one of: a terahertz frequency band, a Q band, a U band, a V band, an E band, a W band, and a D band.

6. The communications system for data networking for a vehicle of claim 1, wherein the antenna steering system operates via one of: an optically generated steering solution and an electrically iterative steering solution, the optically generated steering solution comprising the steps of:
   detecting a field of view having a potential opposing antenna, the detecting via one of: an optical sensor and a radio frequency sensor;
   locating the potential opposing antenna in the field of view;
   measuring a pointing error between the directing and the location of the potential opposing antenna in the field of view; and
   closing the pointing error by steering the second steerable antenna to the potential opposing antenna.

7. A communications system for data networking for a vehicle, comprising:
   a first steerable antenna associated with the vehicle and configured for line of sight directed communication with at least one second antenna, the first steerable antenna is situated for the line of sight directed communication with the at least one second antenna, the line of sight directed communication being through an aperture in the vehicle structure and directed toward the at least one second antenna;
   an antenna steering system associated with the first steerable antenna and configured for one of: an initial fixed alignment and a continuous update, of an antenna steering solution to enable the line of sight directed communication with the at least one second antenna; and
   a data processor coupled with the first steerable antenna for reception and processing of the line of sight directed communication via at least one of: a data compression algorithm, a data decompression algorithm, and a data acceleration algorithm.

8. The communications system for data networking for a vehicle of claim 7, wherein the first steerable antenna further comprises at least one of: a passive electronically scanned array antenna, an active electronically scanned array antenna, a meta material antenna, an electromechanical steered antenna, and a mechanically steered antenna.

9. The communications system for data networking for a vehicle of claim 7, wherein the first antenna is disposed within a vehicle structure and the aperture is one of: a physical opening in the vehicle structure and a radio frequency transparent physical barrier associated with the vehicle structure.

10. The communications system for data networking for a vehicle of claim 7, wherein the first steerable antenna is one of: disposed external to the vehicle structure, incorporated with an additional external antenna system, and incorporated as a portion of a consolidated multi-band transceiver system.

11. A communications system for data networking for a vehicle, comprising:
   a first steerable antenna associated with the vehicle and configured for line of sight directed communication with at least one second antenna, the first steerable antenna is situated for the line of sight directed communication with the at least one second antenna, the line of sight directed communication being one of:

through an aperture in the vehicle structure and directed toward the at least one second antenna;

an antenna steering system associated with the first steerable antenna and configured for one of: an initial fixed alignment and a continuous update, of an antenna steering solution to enable the line of sight directed communication with the at least one second antenna, wherein the antenna steering system operates via one of: an optically generated steering solution and an electrically iterative steering solution, the optically generated steering solution comprising the steps of:

detecting a field of view having a potential opposing antenna, the detecting via one of: an optical sensor and a radio frequency sensor;

locating the potential opposing antenna in the field of view;

measuring a pointing error between the directing and the location of the potential opposing antenna in the field of view; and closing the pointing error by steering the first steerable antenna to the potential opposing antenna.

12. A method for data networking for a vehicle, comprising:

directing a first steerable antenna to continuously communicate with a plurality of satellite vehicles, the first steerable antenna associated with a station, the steerable antenna and configured for multi-band bi-directional communication with the plurality of satellite vehicles;

providing data to a terminal distribution network in communication with at least one of: the first steerable station antenna, a wired network, and a wireless network;

directing a second steerable antenna to enable directed communication with a third antenna, the second steerable antenna in communication with the terminal distribution network and configured for directed communication;

wherein the directing the second steerable antenna is continuously updated by an antenna steering system, the antenna steering system configured for continuous update of an antenna steering solution to enable the directed communication.

13. The method for data networking for a vehicle of claim 12, wherein each of the first steerable antenna and the second steerable antenna further comprise at least one of: a passive electronically scanned array antenna, an active electronically scanned array antenna, a meta material antenna, an electromechanical steered antenna, and a mechanically steered antenna.

14. The method for data networking for a vehicle of claim 12, wherein the data network further includes one of: a wired network and a wireless network having one of a substantially omni-directional antenna, a sectored antenna, and a steerable directional antenna and wherein the first steerable antenna is configured for tracking the plurality of satellite vehicles including a satellite vehicle in at least: a geosynchronous orbit, a low earth orbit, and a medium earth orbit, and wherein the continuous communication is in at least one frequency band associated with the plurality of satellite vehicles.

15. The method for data networking for a vehicle of claim 12, wherein the directed communication is in at least one of: a terahertz frequency band, a Q band, a U band, a V band, an E band, a W band, and a D band.

16. The method for data networking for a vehicle of claim 12, wherein the antenna steering system operates via one of: an optically generated steering solution and an electrically iterative steering solution, the optically generated steering solution comprising the steps of:

detecting a field of view having a potential opposing antenna, the detecting via one of: an optical sensor and a RF sensor;

locating the potential opposing antenna in the field of view;

measuring a pointing error between the directing and the location of the potential opposing antenna in the field of view;

closing the pointing error by steering the second antenna to the potential opposing antenna.

17. The method for data networking for a vehicle of claim 12, further comprising:

directing the third antenna toward the second antenna via the antenna steering system, the third antenna a steerable antenna disposed within a vehicle structure and situated for the line of sight directed communication with the second antenna, the line of sight directed communication being through an aperture in the vehicle structure;

the directing the third antenna is continuously updated by the antenna steering system configured for continuous update of the antenna steering solution to enable the line of sight directed communication.

18. The method for data networking for a vehicle of claim 17, wherein the aperture is one of: a physical opening in the vehicle structure and a radio frequency transparent physical barrier associated with the vehicle structure.

19. The method for data networking for a vehicle of claim 12, wherein the third antenna is one of: disposed external to the vehicle structure, incorporated with an additional external antenna system, and incorporated as a portion of a consolidated multi-band transceiver system.

* * * * *